(12) United States Patent
Sekiya et al.

(10) Patent No.: US 11,494,758 B2
(45) Date of Patent: Nov. 8, 2022

(54) WIRELESS COMMUNICATION DEVICE AND PAYMENT SYSTEM

(71) Applicant: FELICA NETWORKS, INC., Tokyo (JP)

(72) Inventors: Shuichi Sekiya, Saitama (JP); Minako Takahashi, Tokyo (JP); Shintaro Inoue, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 643 days.

(21) Appl. No.: 16/325,072

(22) PCT Filed: Aug. 2, 2017

(86) PCT No.: PCT/JP2017/028069
§ 371 (c)(1),
(2) Date: Feb. 12, 2019

(87) PCT Pub. No.: WO2018/043015
PCT Pub. Date: Mar. 8, 2018

(65) Prior Publication Data
US 2021/0312423 A1  Oct. 7, 2021

(30) Foreign Application Priority Data

Aug. 31, 2016 (JP) .............................. JP2016-168807

(51) Int. Cl.
*G06Q 20/32* (2012.01)
*G06Q 20/06* (2012.01)
(Continued)

(52) U.S. Cl.
CPC ..... *G06Q 20/3278* (2013.01); *G06Q 20/0655* (2013.01); *G06Q 20/20* (2013.01);
(Continued)

(58) Field of Classification Search
CPC .......................... G06Q 20/3815; G06Q 20/409
See application file for complete search history.

(56) References Cited

U.S. PATENT DOCUMENTS

2005/0177716 A1* 8/2005 Ginter ..................... G06F 21/10
713/157
2007/0283151 A1* 12/2007 Nakano ................... H04L 63/12
713/168
(Continued)

FOREIGN PATENT DOCUMENTS

AU    2014306440 A1    3/2016
BR    PI1107008 A2     4/2013
(Continued)

OTHER PUBLICATIONS

ENISA: Security of Mobile Payments and Digital Wallets (Year: 2016).*
(Continued)

*Primary Examiner* — Calvin L Hewitt, II
*Assistant Examiner* — Amanulla Abdullaev
(74) *Attorney, Agent, or Firm* — Chip Law Group

(57) ABSTRACT

There is provided a wireless communication device that includes a communication unit that performs wireless communication with a connection device, and a control unit that encrypts a wireless communication channel with the connection device on the basis of a digital certificate issued by a certificate authority server. The communication unit receives payment information and a valid type of payment from the connection device via the encrypted wireless communication channel. The control unit determines a payment server on the basis of the valid type of payment and causes the communication unit to transmit a payment request based on the payment information to the payment server.

8 Claims, 8 Drawing Sheets

(51) Int. Cl.
  *G06Q 20/20* (2012.01)
  *G06Q 20/38* (2012.01)
(52) U.S. Cl.
  CPC ....... *G06Q 20/325* (2013.01); *G06Q 20/3226* (2013.01); *G06Q 20/3829* (2013.01); *G06Q 20/38215* (2013.01); *G06Q 2220/10* (2013.01)

(56) References Cited

U.S. PATENT DOCUMENTS

| | | | |
|---|---|---|---|
| 2009/0192913 | A1 | 7/2009 | Saito et al. |
| 2012/0149302 | A1 | 6/2012 | Sekiya et al. |
| 2013/0054473 | A1* | 2/2013 | Jan .................. G06Q 20/3223 705/64 |
| 2013/0080276 | A1* | 3/2013 | Granbery .......... G06Q 20/3227 705/21 |
| 2014/0143150 | A1 | 5/2014 | Karlov et al. |
| 2014/0143155 | A1 | 5/2014 | Karlov et al. |
| 2014/0180852 | A1 | 6/2014 | Kamat |
| 2014/0201078 | A1 | 7/2014 | Akashika |
| 2015/0052064 | A1* | 2/2015 | Karpenko .......... G06Q 20/401 705/71 |
| 2015/0317626 | A1 | 11/2015 | Ran et al. |
| 2016/0210622 | A1 | 7/2016 | Yang et al. |
| 2017/0200156 | A1 | 7/2017 | Karpenko et al. |
| 2017/0221056 | A1 | 8/2017 | Karpenko et al. |
| 2018/0070202 | A1* | 3/2018 | Mujibiya ................ H04W 4/02 |

FOREIGN PATENT DOCUMENTS

| | | |
|---|---|---|
| CA | 2921008 A1 | 2/2015 |
| CN | 102594790 A | 7/2012 |
| CN | 105684010 A | 6/2016 |
| EP | 2464085 A1 | 6/2012 |
| EP | 2509037 A1 | 10/2012 |
| EP | 2733654 A1 | 5/2014 |
| EP | 2733655 A1 | 5/2014 |
| EP | 3033725 A1 | 6/2016 |
| EP | 3462704 A1 | 4/2019 |
| JP | 2002-342685 A | 11/2002 |
| JP | 2007-102319 A | 4/2007 |
| JP | 2009-176065 A | 8/2009 |
| JP | 2009-181224 A | 8/2009 |
| JP | 2013-145600 A | 7/2013 |
| JP | 5227482 B1 | 7/2013 |
| JP | 5311612 B2 | 10/2013 |
| JP | 5657364 B2 | 1/2015 |
| JP | 2016-133921 A | 7/2016 |
| KR | 10-2016-0043075 A | 4/2016 |
| RU | 2011149084 A | 6/2013 |
| WO | 2013/047879 A1 | 4/2013 |
| WO | 2013/049528 A1 | 4/2013 |
| WO | 2015/023999 A1 | 2/2015 |
| WO | 2015/167598 A1 | 11/2015 |

OTHER PUBLICATIONS

Office Action for EP Patent Application 17846024.2 dated Sep. 28, 2020, 6 pages.

Extended European Search Report of EP Application No. 17846024.2, dated Jun. 28, 2019, 07 pages.

International Search Report and Written Opinion of PCT Application No. PCT/JP2017/028069, dated Oct. 24, 2017, 09 pages of ISRWO.

* cited by examiner

WIRELESS COMMUNICATION DEVICE AND PAYMENT SYSTEM

CROSS REFERENCE TO RELATED APPLICATIONS

This application is a U.S. National Phase of International Patent Application No. PCT/JP2017/028069 filed on Aug. 2, 2017, which claims priority benefit of Japanese Patent Application No. JP 2016-168807 filed in the Japan Patent Office on Aug. 31, 2016. Each of the above-referenced applications is hereby incorporated herein by reference in its entirety.

TECHNICAL FIELD

The present disclosure relates to a wireless communication device and a payment system.

BACKGROUND ART

With recent development of information communication technology, many technologies related to electronic payment are developed. Specifically, there are payment service technologies using wireless communication, such as near-field communication (NFC) or Bluetooth (registered trademark).

Further, approaches to reduce the processing burden on a payment terminal installed on a store side using a portable terminal possessed by a user are developed nowadays. In one example, Patent Literature 1 discloses an information processing method in which a portable terminal relays the communication between an offline terminal and an electronic money server.

CITATION LIST

Patent Literature

Patent Literature 1: JP 2013-140453A

DISCLOSURE OF INVENTION

Technical Problem

In the information processing method disclosed in Patent Literature 1, however, the portable terminal functions only as a relay for information communication, so it is difficult to employ this relevant portable terminal in a case where a plurality of types of payment, i.e., so-called multi-payment options can be selected.

In view of this, the present disclosure provides a novel and improved wireless communication device and payment system, capable of further reducing the processing burden on a store side in the multi-payment.

Solution to Problem

According to the present disclosure, there is provided a wireless communication device including: a communication unit configured to perform wireless communication with a connection device; and a control unit configured to encrypt a wireless communication channel with the connection device on the basis of a digital certificate issued by a certificate authority server. The communication unit receives payment information and a valid type of payment from the connection device via the encrypted wireless communication channel. The control unit determines a payment server on the basis of the valid type of payment and causes the communication unit to transmit a payment request based on the payment information to the payment server.

In addition, according to the present disclosure, there is provided a wireless communication device including: a communication unit configured to perform wireless communication with a connection device; and a control unit configured to perform encryption processing relating to a wireless communication channel with the connection device on the basis of key information of the connection device, the key information being generated on the basis of a digital certificate issued by a certificate authority. The control unit causes the communication unit to transmit payment information and a valid type of payment via the encrypted wireless communication channel.

In addition, according to the present disclosure, there is provided a payment system including: a first wireless communication device configured to transmit an advertisement relating to payment processing; a second wireless communication device configured to establish wireless communication with the first wireless communication device on the basis of the advertisement; a certificate authority server configured to perform authentication relating to the payment processing; and at least one or more payment servers configured to execute payment processing with the second wireless communication device on the basis of a payment request from the second wireless communication device. The second wireless communication device includes a communication unit configured to perform wireless communication with the first wireless communication device, and a control unit configured to encrypt a wireless communication channel with the first wireless communication device on the basis of a digital certificate issued by the certificate authority server. The communication unit receives payment information and a valid type of payment from the first wireless communication device via the encrypted wireless communication channel. The control unit determines the payment server on the basis of the valid type of payment, causes the communication unit to transmit the payment information and the selected type of payment to the certificate authority server, and causes the communication unit to transmit a payment request based on the payment information to the payment server on the basis of payment approval received from the certificate authority server.

Advantageous Effects of Invention

According to the present disclosure as described above, it is possible to further reduce the processing burden on a store side in the multi-payment.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
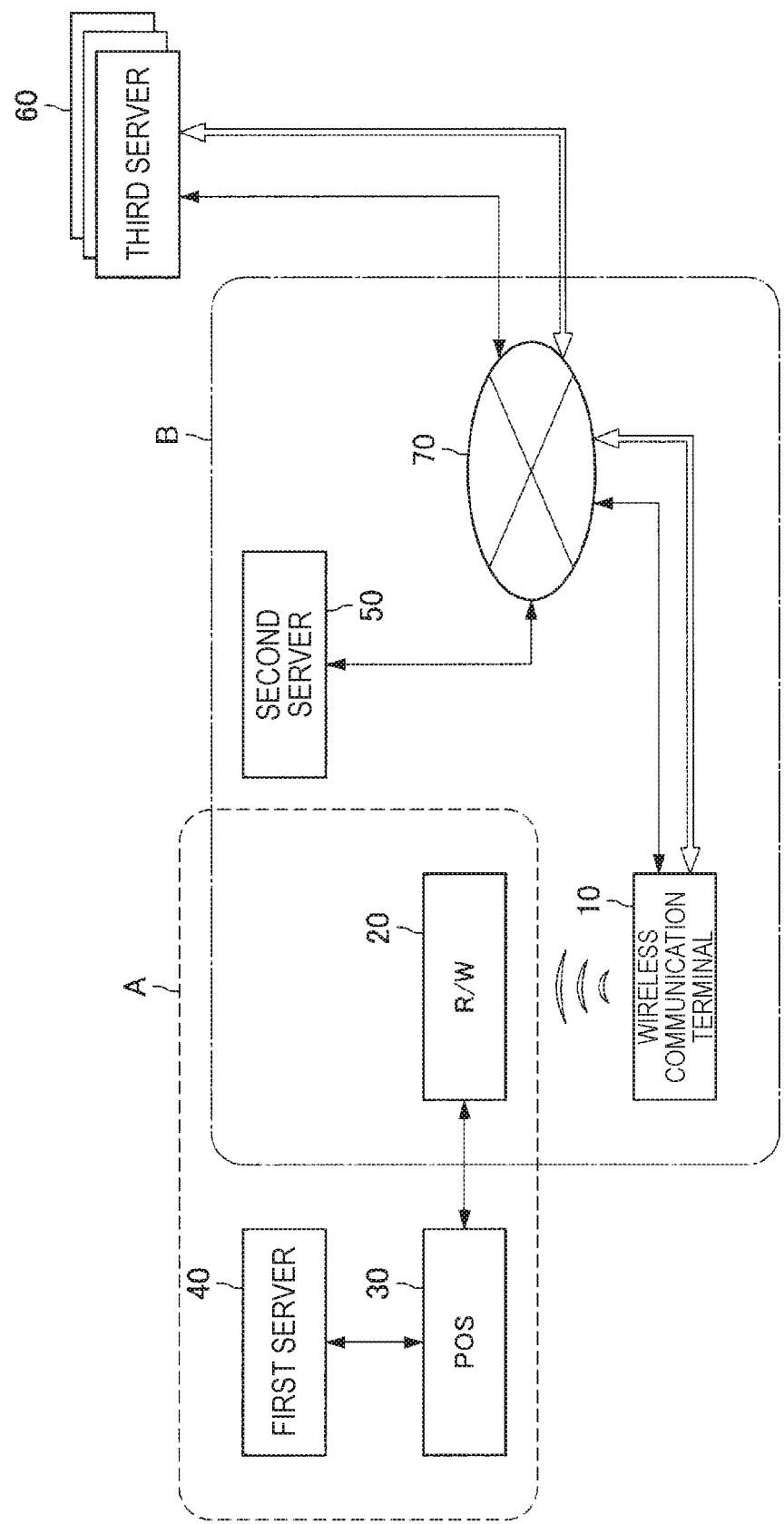
FIG. 1 is a diagram illustrating a configuration example of a payment system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Moreover, the description will be given in the order below.
0. Introduction
0.1. Overview of present disclosure
1. Embodiment
1.1. Configuration example of payment system according to present embodiment
1.2. Comparison with payment system using rich client type R/W
1.3. Comparison with payment system using thin client type R/W
1.4. Functional configuration of wireless communication terminal 10
1.5. Functional configuration of R/W 20
1.6. Operation of payment system
2. Hardware configuration example
3. Concluding remarks

0. INTRODUCTION

<<0.1. Overview of Present Disclosure>>

A type of payment using an integrated circuit (IC) card or a portable terminal equipped with IC card function is widespread nowadays. In one example, a consumer is able to select a type of payment mentioned above as a means of making payment, instead of hard cash, in purchasing goods at the checkout counter. Specifically, the payment processing is performed by allowing a reader/writer (R/W) or the like connected to a point of sale (POS) terminal to read information associated with electronic money held by the IC card via wireless communication such as NFC. The type of payment as mentioned above makes it possible to eliminate the complications due to delivery of hard cash and to enhance the convenience of both consumers and retailers.

On the other hand, in a case where a plurality types of electronic money can be selected for payment as mentioned above, it is necessary for the R/W that performs wireless communication with the portable terminal to handle key information relating to a plurality of types of electronic money. For this reason, it is desirable to provide an approach to reduce the cost of installing the rich client type R/W as mentioned above or to reduce the processing load caused by the rich client type R/W.

On the other hand, an approach to allow a multi-payment service provider to mediate payment processing with an electronic money provider on the basis of information read by a general-purpose thin client type R/W is also widespread. However, in a case of using the approach as mentioned above, the responsibility demarcation between the store side and the multi-payment provider becomes complicated.

The technical idea according to the present disclosure is conceived focusing on the above points, and it allows for reducing the processing burden on the store side in the multi-payment and for simplifying the responsibility demarcation concerning the electronic payment. Thus, the wireless communication terminal according to the present disclosure has a function of determining a payment server on the basis of payment information received via the encrypted wireless communication channel with the R/W and a valid type of payment and of transmitting a payment request based on the payment information to the relevant payment server.

The following description of the embodiment is specifically given of the structural features of a wireless communication terminal, an R/W, and a payment system according to the present disclosure and effects achieved by the features. In addition, the following description of the embodiment is given of a case where the wireless communication terminal, the R/W, and the payment system according to the present disclosure are applied to a commercial store as an example. However, the wireless communication terminal, the R/W, and the payment system according to the present disclosure are not limited to such examples. The wireless communication terminal, the R/W, and the payment system according to the present disclosure are also applicable to electronic payment for, in one example, a vending machine, a taxi, or the like. The wireless communication terminals, the R/W, and the payment system are widely applicable to various types of service using electronic payment.

1. EMBODIMENT

<<1.1. Configuration Example of Payment System According to Present Embodiment>>

A configuration example of a payment system according to an embodiment of the present disclosure is now described. FIG. 1 is a diagram illustrating a configuration example of a payment system according to the present embodiment. Referring to FIG. 1, the payment system according to the present embodiment includes a wireless communication terminal 10, an R/W 20, a POS 30, a first server 40, a second server 50, and a third server 60. In addition, the connection between the wireless communication terminal 10 and the second server 50 and the connection between the wireless communication terminal 10 and the third server 60 are established so that they can communicate with each other via a network 70.

(Wireless Communication Terminal 10)

The wireless communication terminal 10 according to the present embodiment can be various wireless communication devices having a secure element (SE). The wireless communication terminal 10 according to the present embodiment can be, in one example, a mobile phone, a smartphone, a tablet computer, a wearable device, or the like possessed by a user.

Further, the wireless communication terminal 10 according to the present embodiment has a function of encrypting a wireless communication channel with the R/W 20 and receiving payment information and a valid type of payment from the R/W 20. In this event, the wireless communication terminal 10 according to the present embodiment performs wireless communication with the R/W 20 using, in one example, Bluetooth low energy (BLE) or the like. In addition, the wireless communication terminal 10 according to the present embodiment has a function of determining the third server 60 to be connected on the basis of the received valid type of payment and transmitting a payment request based on the payment information to the third server 60. In this event, the wireless communication terminal 10 according to the present embodiment can determine the third server 60 to be connected on the basis of the type of payment selected by the user. Details of the functions of the wireless communication terminal 10 according to the present embodiment will be described later.

(R/W 20)

The R/W 20 according to the present embodiment is connected to the POS 30 installed at a store side and performs wireless communication with the wireless communication terminal 10. In addition, the R/W 20 according to the present embodiment is characterized in that it has a server certificate issued from the second server 50 on the basis of preliminary authentication. Details of the functions of the R/W 20 according to the present embodiment will be described later.

(POS 30)

The POS 30 according to the present embodiment is an information management system installed at the store side. The POS 30 according to the present embodiment receives the information read by the R/W 20 and transmits it to the first server 40.

(First Server 40)

The first server 40 according to the present embodiment can be an information processing server installed by a provider that provides service at a store (hereinafter also referred to as a service provider). The first server 40 according to the present embodiment can have a function of receiving various pieces of information from the POS 30, saving the information and performing various types of processing based on the information. In addition, the first server 40 according to the present embodiment outputs billing information for the third server 60 on the basis of a processing log that is output from the second server 50.

(Second Server 50)

The second server 50 according to the present embodiment can be an information processing server installed by an intermediary provider that mediates processing between the service provider and the electronic money provider. In addition, the second server 50 according to the present embodiment plays a role as a certificate authority server. The second server 50 according to the present embodiment authenticates the service provider and issues a digital certificate relating to the relevant authentication. Here, the digital certificate mentioned above can include a server certificate and a CA certificate.

Further, the second server 50 according to the present embodiment performs payment approval on the basis of payment information, type of payment, store information, or the like received from the wireless communication terminal 10 and transmits information relating to the relevant approval to the wireless communication terminal 10.

Further, the second server 50 according to the present embodiment has a function of outputting the processing log relating to payment regularly or irregularly on the basis of the payment information, type of payment, store information, or the like received from the wireless communication terminal 10. Here, the processing log can be output, in one example, for each service provider or store.

(Third Server 60)

The third server 60 according to the present embodiment can be a payment server installed by an electronic money provider. In other words, the third server 60 according to the present embodiment can be installed by different electronic money providers for each type of payment (hereinafter, also referred to as type of electronic money). Thus, as illustrated in FIG. 1, a plurality of third servers 60 according to the present embodiment can exist. The third server 60 according to the present embodiment has a function of executing payment processing based on a payment request received from the wireless communication terminal 10. In this event, the payment processing mentioned above is performed between the wireless communication terminal 10 and the third server 60 in an end-to-end (E2E) scheme.

(Network 70)

The network 70 has a function of connecting between the wireless communication terminal 10 and the second server 50 and between the wireless communication terminal 10 and the third server 60. The network 70 can include a public line network such as the Internet, telephone networks, satellite communication networks, various local area networks (LANs) and wide area networks (WANs) including Ethernet (registered trademark), or the like. In addition, the network 70 can include a leased line network such as Internet protocol-virtual private network (IP-VPN).

In addition, the network 70 can include a wireless communication network such as Wi-Fi (registered trademark) or Bluetooth.

<<1.2. Comparison with Payment System Using Rich Client Type R/W>>

Comparison between the payment system according to the present embodiment and a payment system using a rich client type R/W (hereinafter also referred to as rich client type system) is now described. The configuration of the rich client type system is first described.

Figure 2:
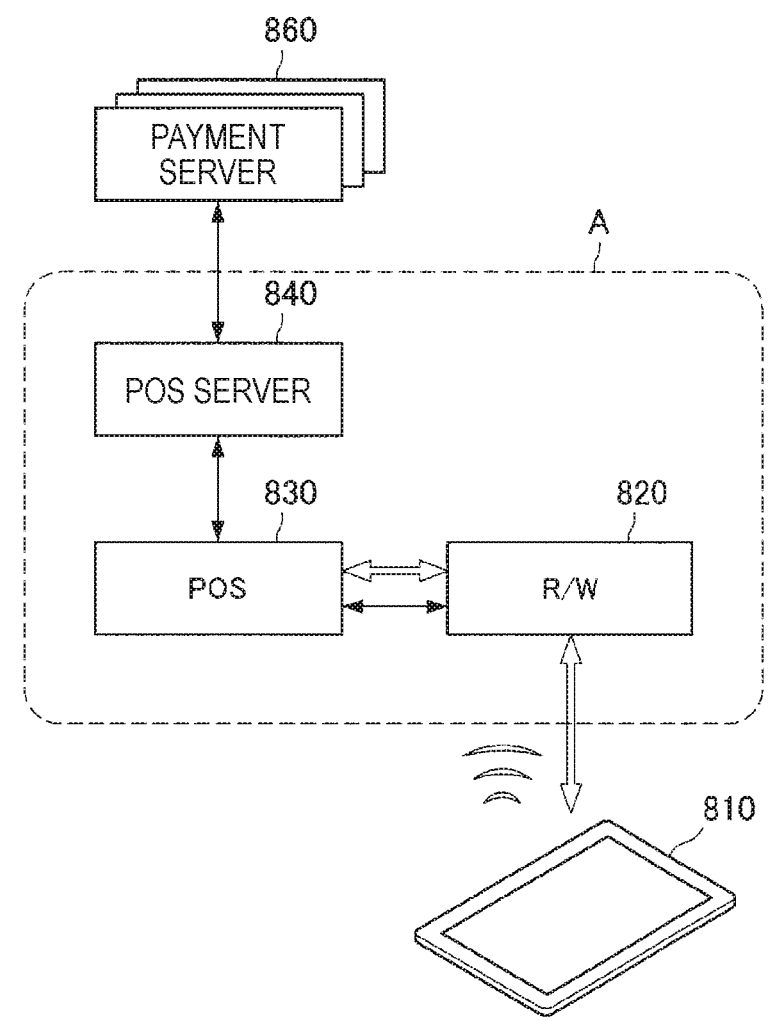
FIG. 2 is a diagram illustrating a configuration example of a rich client type system according to the related art of the present disclosure.

FIG. 2 is a diagram illustrating a configuration example of the rich client type system. Referring to FIG. 2, the rich client type system includes an IC card 810, an R/W 820, a POS 830, a POS server 840, and a payment server 860.

(IC Card 810)

The IC card 810 holds information relating to a plurality types of electronic money. In addition, the IC card 810 can be a mobile terminal having an IC card function.

(R/W 820)

The R/W 820 has a function of performing short-range wireless communication with the IC card 810, reading information recorded on the IC card 810, and writing information to the IC card 810. In this event, the R/W 820 performs short-range wireless communication with the IC card 810 using, in one example, NFC, or the like. In addition, the R/W 820 is a rich client type R/W that executes payment processing based on the determined type of electronic money with the IC card 810. Thus, the R/W 820 has key information relating to a plurality types of electronic money.

(POS 830)

The POS 830 has a function of receiving information relating to electronic payment from the R/W 820 to be connected or transmitting a type of electronic money used for payment to the R/W 820. Here, the type of electronic money used for payment mentioned above can be determined depending on the valid type of electronic money on the store side, the type of electronic money held by the IC card 810, and the type of electronic money selected by the user or the staff on the store side. The user or the staff on the store side can select the type of electronic money used for payment, in one example, through a display unit and an input unit included in the POS 830.

(POS Server 840)

The POS server 840 is an information processing server installed by the service provider. The POS server 840 acquires information relating to electronic payment from the POS 830 and executes billing processing to the payment server 860 for each type of electronic money relating to the electronic payment.

(Payment Server 860)

The payment server 860 is an information processing server that is set by the electronic money provider. The payment server 860 executes various processing operations based on the billing from the POS server 840.

The configuration of the rich client type system is described above. As described above, the rich client type system is characterized by using the rich client type R/W 820 that handles a plurality types of electronic money and executes the payment processing with the IC card 810. For this reason, the rich client type system tends to be expensive to install as compared to the payment system that can employ the general-purpose R/W 20 according to the present embodiment. In other words, the payment system according to the present embodiment makes it possible to reduce significantly the installation cost on the store side by using the cheaper R/W 20.

Further, FIGS. 1 and 2 illustrate the communication relating to the payment processing by void arrows. Here, referring to FIG. 1, the payment system according to the present embodiment performs the payment processing between the wireless communication terminal 10 and the third server 60. On the other hand, referring to FIG. 2, in the rich client type system, the payment processing is executed between the IC card 810, the R/W 820, and the POS 830. Thus, the processing burden on the store side in the rich client type system is larger than that in the payment system according to the present embodiment, and the electronic money provider has the burden of depositing its own key information in the service provider. On the other hand, the payment system according to the present embodiment executes the payment processing between the wireless communication terminal 10 possessed by the user and the third server 60, so it is possible to reduce significantly the processing burden on the store side and to reduce the burden on the electronic money provider.

<<1.3. Comparison with Payment System Using Thin Client Type R/W>>

Comparison between the payment system according to the present embodiment and a payment system using a thin client type R/W (hereinafter also referred to as a thin client type system) is now described. The configuration of the thin client type system is first described.

Figure 3:
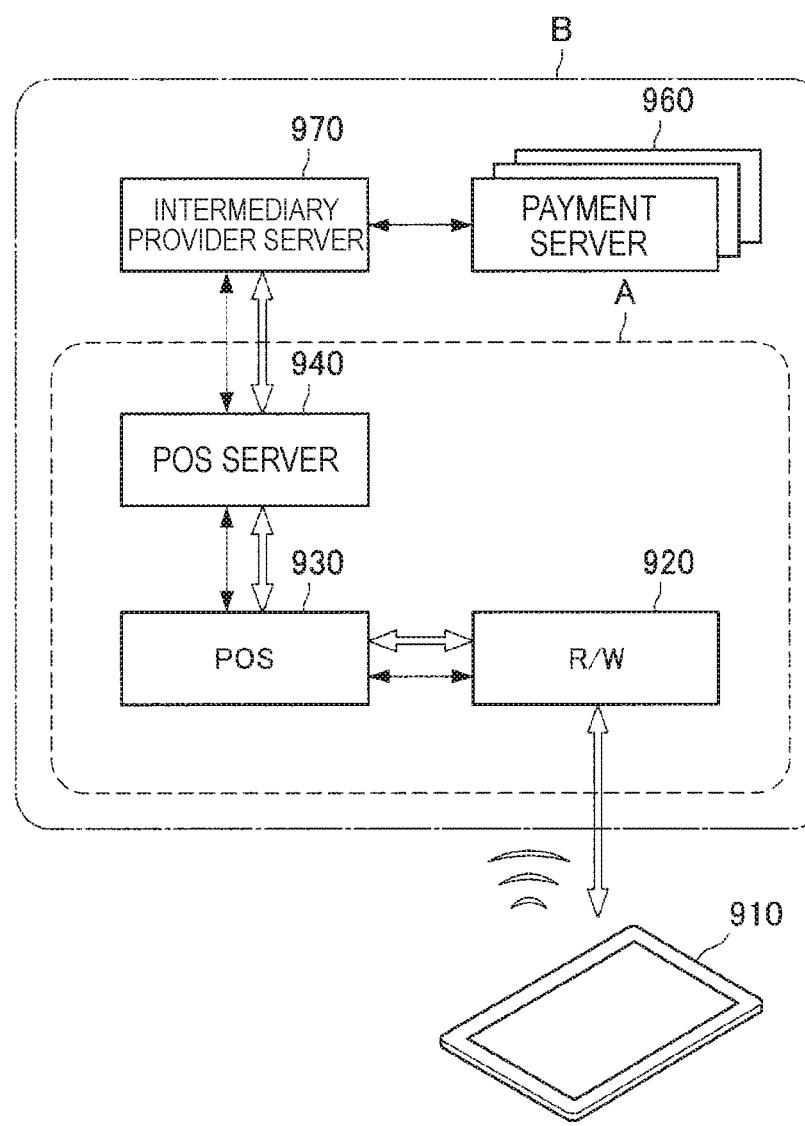
FIG. 3 is a diagram illustrating a configuration example of a thin client type system according to the related art of the present disclosure.

FIG. 3 is a diagram illustrating a configuration example of a thin client type system. Referring to FIG. 3, the thin client type system includes an IC card 910, an R/W 920, a POS 930, a POS server 940, an intermediary provider server 970, and a payment server 960. The following description is mainly given of the difference from the rich client type system, and description of the configuration and functions common to the rich client type system will be omitted.

(R/W 920)

The R/W 920 can be an R/W that does not have the function of payment processing with the IC card 910 unlike the R/W 820 in the rich client type system. Thus, the R/W 920 is characterized by having a minimum function such as a wireless communication function using NFC.

(POS 930)

The POS 930 receives information relating to electronic money from the R/W 920 connected thereto. In addition, the POS 930 transmits payment information including information relating to the electronic money, a type of electronic money used for payment, and a payment amount to the POS server 940.

(POS Server 940)

The POS server 940 transmits the payment information including the information relating to electronic money, the type of electronic money used for payment, and the payment amount, received from the POS 930 to the intermediary provider server 970.

(Intermediary Provider Server 970)

The intermediary provider server 970 can be an information processing server installed by an intermediary provider that mediates processing between the service provider and the electronic money provider. The intermediary provider server 970 executes the payment processing based on the payment information including information relating to electronic money, the type of electronic money used for payment, and the payment amount, which is received from the POS server 940, and executes billing processing relating to the payment processing with respect to the payment server 960.

The configuration of the thin client type system is described above. As described above, the thin client type system is capable of using relatively inexpensive R/W 920 unlike the rich client type system. On the other hand, the thin client system performs the payment processing between the IC card 910, the R/W 920, the POS 930, the POS server 940, and the intermediary provider server 970 as illustrated in FIG. 3, so there is a tendency that the processing burden on the store side increases. In addition, each component installed on the store side is typically necessary to be online to be connected with the intermediary provider server 970. On the other hand, in the payment system according to the present embodiment, the R/W 20, the POS 30, and the first server 40 installed on the store side are not necessarily online, so it is possible to execute the payment processing even in a case where the R/W 20 or the like is an offline terminal or where a network failure occurs at the store side.

Further, FIGS. 1 to 3 illustrate a responsibility range A of the service provider relating to the payment processing and a responsibility range B of the intermediary provider. Here, referring to FIG. 3, in the thin client type system, the responsibility range A of the service provider and the responsibility range B of the intermediary provider are largely overlapped, indicating that the responsibility demarcation is complicated. On the other hand, in the payment system according to the present embodiment illustrated in FIG. 1, overlapped portion between the responsibility range A of the service provider and the responsibility range B of the intermediary provider is significantly simpler than that of the thin client type system. In this way, the payment system of the present embodiment makes it possible to reduce significantly the processing burden on the store side and to clarify the responsibility demarcation between the service provider and the intermediary provider.

<<1.4. Functional Configuration of Wireless Communication Terminal 10>>

Figure 4:
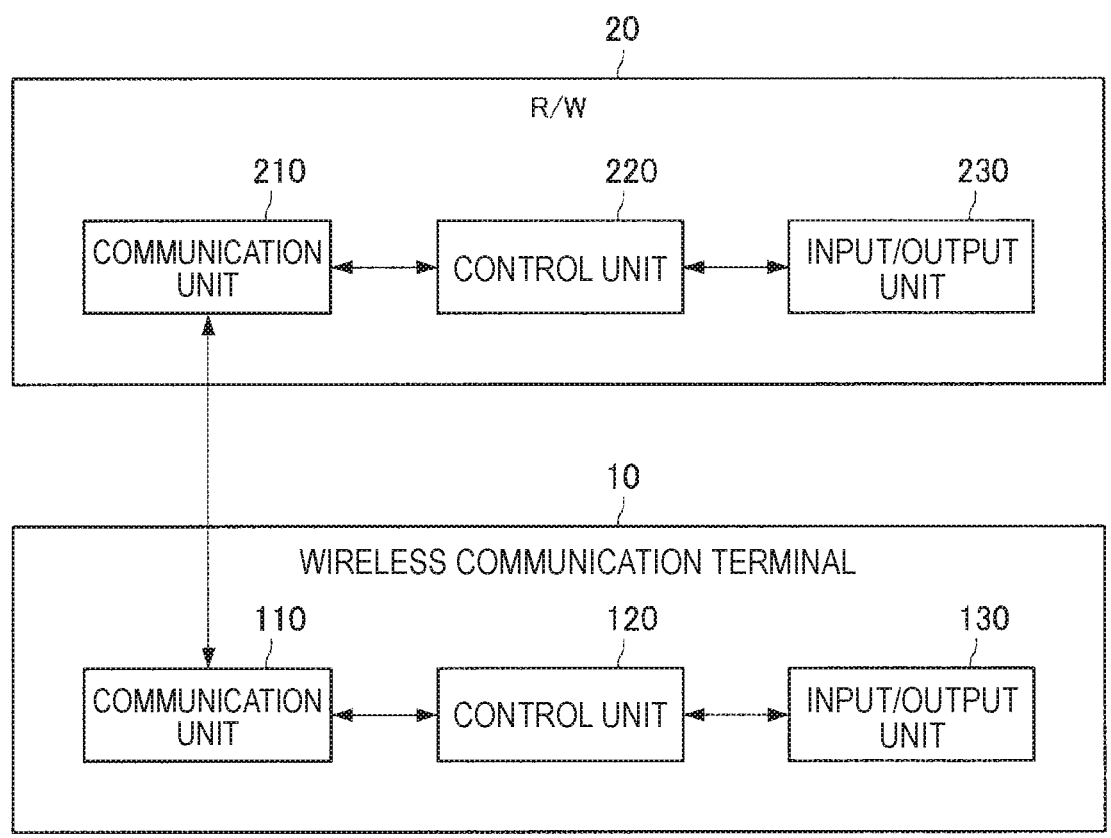
FIG. 4 is a functional block diagram of a wireless communication terminal and an R/W according to the present embodiment.

The functional configuration of the wireless communication terminal 10 according to the present embodiment is now described. FIG. 4 is a functional block diagram of the wireless communication terminal 10 and the R/W 20 according to the present embodiment. Referring to FIG. 4, the wireless communication terminal 10 according to the present embodiment includes a communication unit 110, a control unit 120, and an input/output unit 130.

(Communication Unit 110)

The communication unit 110 has a function of performing wireless communication with a connection device. The communication unit 110 performs wireless communication with the R/W 20 acting as the connection device using, in one example, BLE. The communication unit 110 according to the present embodiment is capable of establishing wireless communication with the R/W 20 on the basis of an advertisement transmitted by the R/W 20.

Further, the communication unit 110 according to the present embodiment has a function of transmitting and receiving information relating to encryption of a wireless communication channel with the R/W 20. The communication unit 110 according to the present embodiment can receive, in one example, a server certificate, or the like from the R/W 20.

Further, the communication unit 110 according to the present embodiment receives the payment information, valid type of payment, and store information from the R/W 20 via the encrypted wireless communication channel. Here, the payment information mentioned above can include, in one example, a payment amount, a payment item, a payment currency type, and the like. In addition, the valid type of payment mentioned above can be a type of electronic money that can be handled at the store side. In addition, the store information mentioned above can be identification information used to specify a store where the R/W 20 is installed or a service provider.

Further, the communication unit 110 according to the present embodiment transmits a payment request to the third server 60 on the basis of control of the control unit 120. In addition, in a case where the payment processing based on the payment request mentioned above is completed, the communication unit 110 according to the present embodiment transmits a payment completion notification to the R/W 20 on the basis of control of the control unit 120.

(Control Unit 120)

The control unit 120 has a function of controlling the entire operation of the wireless communication terminal 10. Specifically, the control unit 120 according to the present embodiment is equipped with a function of encrypting the wireless communication channel with the R/W 20 on the basis of the digital certificate issued by the second server 50. As described above, the digital certificate mentioned above can include a server certificate and a CA certificate.

Further, the control unit 120 according to the present embodiment has a function of determining the third server 60 to be connected on the basis of the valid type of electronic money received by the communication unit 110. In this event, the control unit 120 can determine the third server 60 to be connected further on the basis of the type of electronic money selected by the user. In addition, the control unit 120 according to the present embodiment causes the communication unit 110 to transmit the payment request based on the payment information to the third server 60 determined as described above.

Further, the control unit 120 according to the present embodiment can perform control so that it receives a payment approval from the second server 50 prior to the control of the payment request to the third server 60. Specifically, the control unit 120 can cause the communication unit 110 to transmit the payment information, the store information, and the selected type of electronic money to the second server 50. In this case, the control unit 120 can cause the communication unit 110 to transmit the payment request on the basis of the receipt of payment approval based on each piece of information mentioned above from the second server 50.

Further, the control unit 120 according to the present embodiment has a function of determining information associated with electronic money possessed by the wireless communication terminal 10 in a case of performing the communication control relating to the payment approval or payment request mentioned above. Specifically, the control unit 120 can cause the communication unit 110 to execute the payment approval mentioned above or the transmission of information relating to the payment approval on the basis of retention of the electronic money corresponding to the valid type of electronic money received by the communication unit 110 in the control unit 120. In addition, the control unit 120 can cause the communication unit 110 to execute the payment approval mentioned above or the transmission of information relating to the payment approval on the basis of the electronic money having the balance equal to or more than the payment amount.

Further, the control unit 120 according to the present embodiment causes the communication unit 110 to transmit the payment completion notification to the R/W 20 on the basis of completion of the payment processing based on the payment request mentioned above.

Further, the control unit 120 can have a function of controlling input and output of the input/output unit 130. In one example, the control unit 120 can execute various processing on the basis of the information input from the input/output unit 130 and can output a result of the processing to the input/output unit 130.

Moreover, a part of the control unit 120 can operate as an SE. In one example, the control unit 120 executes processing relating to encryption and decryption in the communication of the communication unit 110.

(Input/Output Unit 130)

The input/output unit 130 has a function of receiving an input operation by the user. The function mentioned above can be implemented by, in one example, various buttons, levers, a keyboard, a mouse, a touch panel, a microphone, and the like. In addition, the input/output unit 130 has a function of outputting various pieces of information under the control of the control unit 120. The input/output unit 130 according to the present embodiment has a function of displaying, in one example, a user interface (UI) allowing the user to select a type of payment. Moreover, the function mentioned above can be implemented by, in one example, various display devices, speech output devices, light sources including light emitting diode (LED), or the like.

Further, the display device mentioned above can be implemented by, in one example, a cathode ray tube (CRT) display device, a liquid crystal display (LCD) device, an organic light emitting diode (OLED) device, or the like.

The functional configuration of the wireless communication terminal 10 according to the present embodiment is described above. Although the above description with reference to FIG. 4 is given of the case where the wireless communication terminal 10 includes the communication unit 110, the control unit 120, and the input/output unit 130, the functional configuration of the wireless communication terminal 10 according to the present embodiment is not limited to such an example. The wireless communication terminal 10 according to the present embodiment can further include, in one example, a component other than that illustrated in FIG. 4. The wireless communication terminal 10 can further include, in one example, a storage unit that retains various data used for processing by the control unit 120. The functional configuration of the wireless communication terminal 10 according to the present embodiment can be changed flexibly depending on the specification and operation of service.

<<1.5. Functional Configuration of R/W 20>>

With continued reference to FIG. 4, the functional configuration of the R/W 20 according to the present embodiment is described. Referring to FIG. 4, the R/W 20 according to the present embodiment includes a communication unit 210, a control unit 220, and an input/output unit 230.

(Communication Unit 210)

The communication unit 210 has a function of performing wireless communication with a connection device. The communication unit 210 performs wireless communication with the wireless communication terminal 10 acting as the connection device using, in one example, BLE. In addition, the communication unit 210 according to the present embodiment has a function of transmitting and receiving information relating to encryption of a wireless communication channel with the wireless communication terminal 10.

Further, the communication unit 210 according to the present embodiment transmits the payment information, valid type of electronic money, and store information to the wireless communication terminal 10 via the encrypted wireless communication channel on the basis of control of the control unit 220.

Further, the communication unit 210 according to the present embodiment receives the payment completion notification from the wireless communication terminal 10 via the encrypted wireless communication channel. In addition, the communication unit 210 can transmit the received payment completion notification to the POS 30.

(Control Unit 220)

The control unit 220 has a function of controlling the entire operation of the R/W 20. Specifically, the control unit 220 according to the present embodiment has a function of performing encryption processing relating to the wireless communication channel with the wireless communication terminal 10 on the basis of key information, which is generated by the wireless communication terminal 10 on the basis of the digital certificate issued by the second server 50.

Further, the control unit 220 according to the present embodiment causes the communication unit 210 to transmit the payment information, the valid type of electronic money, and the store information via the encrypted wireless communication channel.

Further, the control unit 220 according to the present embodiment can have a function of controlling input and output relating to the input/output unit 230. In one example, the control unit 220 can execute various processing operations on the basis of the information input from the input/output unit 230 and cause the input/output unit 230 to output a result obtained by the processing.

(Input/Output Unit 230)

The input/output unit 230 has a function of receiving an input operation by a user or a store operator. The function mentioned above can be implemented by, in one example, various buttons, levers, a keyboard, a mouse, a touch panel, or the like. In addition, the input/output unit 230 has a function of outputting various pieces of information on the basis of control of the control unit 220. The function mentioned above can be implemented by, in one example, various display devices, speech output devices, light sources including LED, or the like.

Further, the display device mentioned above can be implemented by, in one example, a CRT display device, a liquid crystal display device, an OLED device, or the like.

The functional configuration of the R/W 20 according to the present embodiment is described above. Although the above description with reference to FIG. 4 is given of the case where the R/W 20 includes the communication unit 210, the control unit 220, and the input/output unit 230, the functional configuration of the R/W 20 according to the present embodiment is not limited to such an example. The R/W 20 according to the present embodiment can further include, in one example, a component other than that illustrated in FIG. 4. The R/W 20 can further include, in one example, a storage unit that retains various data used for processing by the control unit 220.

Further, the R/W 20 does not necessarily have either the input function or the output function of the input/output unit 230, or both functions. In this case, it is possible to further reduce the manufacturing cost of the R/W 20. The functional configuration of the R/W 20 according to the present embodiment can be changed flexibly depending on the specification and operation of service.

<<1.6. Operation of Payment System>>

The operation of the payment system according to the present embodiment is now described in detail. The operation of the payment system according to the present embodiment is roughly divided into establishment of the wireless communication channel between the wireless communication terminal 10 and the R/W 20 (S1010), encryption of the wireless communication channel (S1020), payment processing (S1030), and billing processing (S1050).

(Establishment of Wireless Communication Channel)

Figure 5:
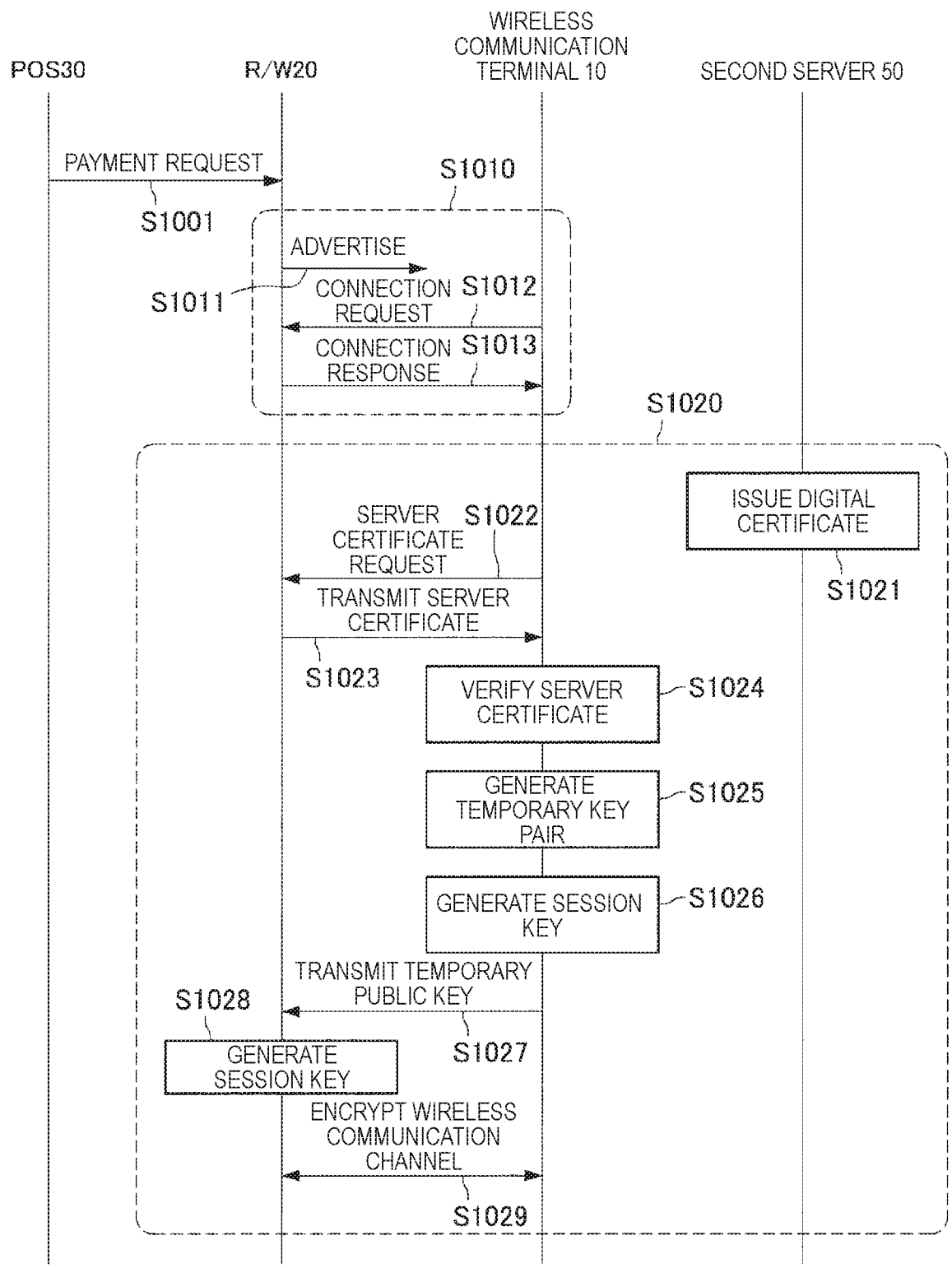
FIG. 5 is a sequence diagram illustrating an operation of a payment system in relation to the establishment and encryption of a wireless communication channel according to the present embodiment.

The flow of establishment of a wireless communication channel between the wireless communication terminal 10 and the R/W 20 (S1010) according to the present embodiment is first described. FIG. 5 is a sequence diagram illustrating the operation of the payment system in relation to the establishment and encryption of the wireless communication channel according to the present embodiment.

Referring to FIG. 5, first, the POS 30 according to the present embodiment transmits a payment request corresponding to goods or service purchased by a user to the R/W 20 (S1001). Moreover, step S1001 can be performed after step S1010 or step S1020.

Then, the R/W 20 and the wireless communication terminal 10 according to the present embodiment establish the wireless communication channel therebetween (S1010). Here, first, the R/W 20 transmits an advertisement relating to the payment processing (S1011).

Then, the wireless communication terminal 10 according to the present embodiment issues a connection request to the R/W 20 on the basis of the advertisement transmitted in step S1011 (S1012).

Then, the R/W 20 executes a connection response to the connection request issued in step S1012 (S1013). The connection request in step S1012 and the connection response in step S1013 allow the wireless communication channel between the wireless communication terminal 10 and the R/W 20 to be established. Moreover, in this event, the wireless communication terminal 10 can notify the user that the connection is established by turning on a light source or generating vibration.

(Encryption of Wireless Communication Channel)

The flow of encryption of the wireless communication channel (S1020) according to the present embodiment is described with continued reference to FIG. 5. In the encryption of the wireless communication channel in step S1020, the second server 50 issues a digital certificate in advance (S1021). Specifically, the second server 50 can issue a telegraphic certificate and a CA certificate.

When the wireless communication channel is established in step S1010, the wireless communication terminal 10 first requests the server certificate from the R/W 20 (S1022).

Then, the R/W 20 transmits the server certificate issued in step S1021 and a server public key to the wireless communication terminal 10 in response to the request issued in step S1022 (S1023).

Then, the wireless communication terminal 10 verifies the server certificate received in step S1023 using the CA certificate issued in step S1021 (S1024).

Here, when the validity of the server certificate is confirmed, the wireless communication terminal 10 subsequently generates a temporary key pair (S1025). In this event, in one example, the wireless communication terminal 10 can also generate a client temporary private key and a client temporary public key.

Subsequently, the wireless communication terminal 10 generates a session key using the server public key received in step S1023 and the client temporary private key generated in step S1025 (S1026).

Further, the wireless communication terminal 10 subsequently transmits the client temporary public key generated in step S1025 to the R/W 20 (S1027).

Then, the R/W 20 generates a session key using the client temporary public key received in step S1027 and the retained server private key (S1028).

Then, the wireless communication terminal 10 and the R/W 20 perform encryption of the wireless communication channel using the session keys generated in steps S1026 and S1028 (S1029).

The flow of the establishment and encryption of the wireless communication channel according to the present embodiment is described above. The functions of the wireless communication terminal 10 and the R/W 20 according to the present embodiment make it possible for the wireless communication terminal 10 to perform the communication relating to the payment processing only with the R/W 20 having the server certificate issued in advance by the second server 50. Thus, the wireless communication terminal 10, the R/W 20, and the payment system according to the present embodiment make it possible to implement the electronic payment with high security while reducing the processing burden on the store side.

(Payment Processing)

Figure 6:
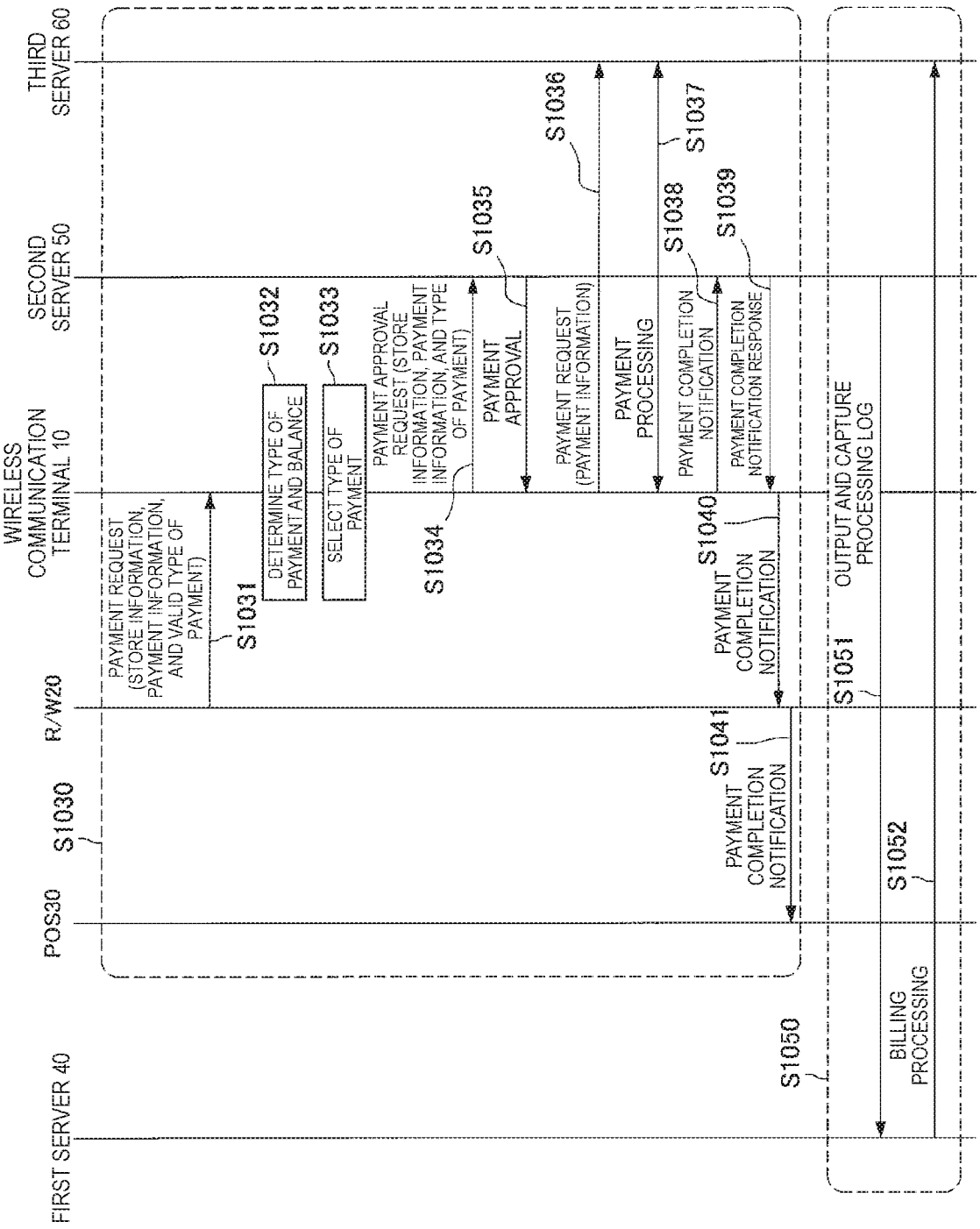
FIG. 6 is a sequence diagram illustrating an operation of a payment system in relation to the payment processing and billing processing according to the present embodiment.

Then, the flow of the payment processing (S1030) between the wireless communication terminal 10 and the third server 60 according to the present embodiment is described. FIG. 6 is a sequence diagram illustrating the operation of the payment system in relation to the payment processing and the billing processing according to the present embodiment.

Referring to FIG. 6, first, the R/W 20 according to the present embodiment issues a payment request to the wireless communication terminal 10 (S1031). Specifically, the R/W 20 transmits payment information, store information, and valid type of electronic money. Here, as described above, the payment information mentioned above can include information such as payment amount, payment item, and payment currency type.

Then, the wireless communication terminal 10 determines the type of electronic money and the balance on the basis of the payment request received in step S1031 (S1032). Specifically, the wireless communication terminal 10 determines the valid type of electronic money by comparing the valid type of electronic money received in step S1031 with the type of electronic money retained by the wireless communication terminal 10.

Further, the wireless communication terminal 10 compares the payment amount received in step S1031 with the balance of the valid type of electronic money mentioned above, and determines the type of electronic money that is capable of being used for payment. Here, in a case where the wireless communication terminal 10 does not have a type of electronic money that is capable of being used for payment, the wireless communication terminal 10 can terminate the processing relating to the payment processing. In this event, the wireless communication terminal 10 can cause the input/output unit 130 to display the fact that there is no type of electronic money capable of being used for payment.

On the other hand, in a case where there is a type of electronic money capable of being used for payment, the wireless communication terminal 10 causes the input/output unit 130 to display a UI for the user to select a type of electronic money used for payment, and determines the type of electronic money to be used for payment on the basis of the selection operation by the user (S1033).

Figure 7:
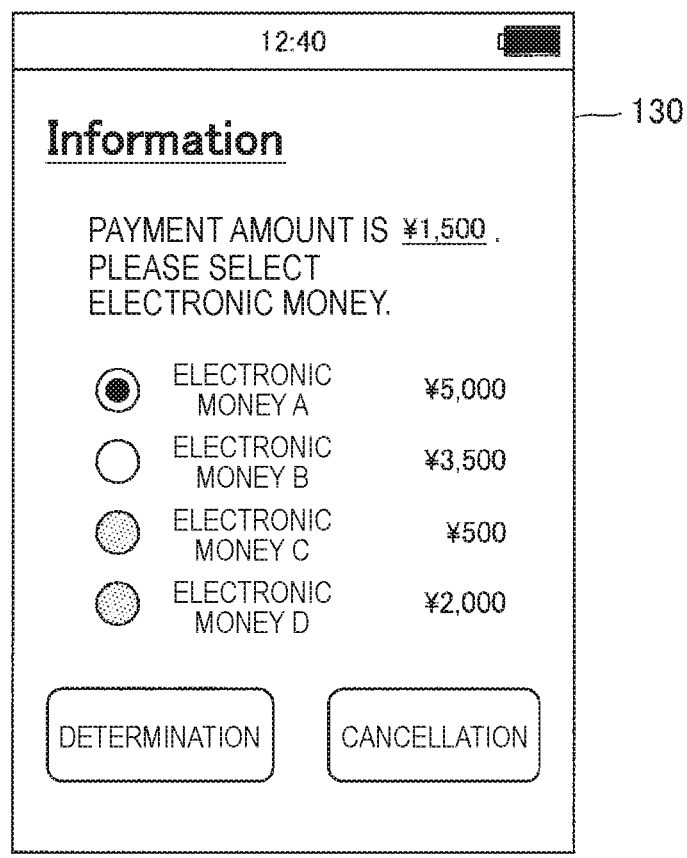
FIG. 7 is an example of a screen for selecting a type of electronic money outputted to an input/output unit of the wireless communication terminal according to the present embodiment.

FIG. 7 is an example of a screen for selecting the type of electronic money to be output to the input/output unit 130 of the wireless communication terminal 10. Referring to FIG. 7, the payment amount and a plurality of types of electronic money retained by the wireless communication terminal 10 are displayed on the screen for selecting the type of electronic money. Here, in the example illustrated in FIG. 7, electronic money A and electronic money B are selectable, and electronic money C and electronic money D are incapable of being selected. In this way, the wireless communication terminal 10 according to the present embodiment can perform control so that the user is prevented from selecting the type of electronic money that is not supported by the store side and the type of electronic money whose balance is insufficient.

In the case of the example illustrated in FIG. 7, the electronic money C indicates a type of electronic money that is incapable of being used for payment because it is supported by the store side but the balance thereof is insufficient. In addition, the electronic money D indicates a type of electronic money that is incapable of being used for payment because it is not supported by the store side. The wireless communication terminal 10 is capable of performing the control as described above on the basis of the payment information and the valid type of electronic money received in step S1031. The functions mentioned above of the wireless communication terminal 10 according to the present embodiment make it possible to eliminate the need for the POS 30 installed by the service provider to have a UI relating to selection of the type of electronic money, thereby reducing the installation cost and processing burden on the store side.

Moreover, the selection of the type of electronic money by the user in step S1033 is not necessarily performed. The wireless communication terminal 10 according to the present embodiment is capable of, in one example, automatically selecting a valid type of electronic money having sufficient balance. In addition, the wireless communication terminal 10 can select the type of electronic money to be used for payment on the basis of the priority selected in advance by the user. The processing performed by the wireless communication terminal 10 according to the present embodiment makes it possible to shorten the time taken for the payment processing and eliminate the complication of the user operating the screen.

The operation relating to the payment processing is described with continued reference again to FIG. 6. When the user selects the type of electronic money to be used for payment, the wireless communication terminal 10 subsequently transmits payment approval to the second server 50 (S1034). Specifically, the wireless communication terminal 10 transmits the store information, the payment information, and the selected type of electronic money to the second server 50.

Then, the second server 50 saves the information mentioned above received in step S1034 and transmits a notification relating to the payment approval to the wireless communication terminal 10 (S1035). The payment approval performed by the second server 50 in step S1035 makes it possible for the second server 50 to save a trail relating to the electronic payment, thereby implementing the billing processing (S1050) to be performed later. In addition, the intermediary provider who installs the second server 50 is able to acquire purchase information of the user in addition to the substitution for the payment processing, so it can be expected that the information is analyzed and used as big data.

Upon receiving the payment approval in step S1035, then the wireless communication terminal 10 determines the third server 60 to be connected on the basis of the type of electronic money selected in step S1033, and transmits the payment request to the third server 60 (S1036). Specifically, the wireless communication terminal 10 can transmit the payment amount included in the payment information to the third server 60. In this way, the determination of the third server 60 to which the wireless communication terminal 10 is connected makes it possible to reduce significantly the processing burden on the store side.

Then, the third server 60 executes the payment processing with the wireless communication terminal 10 on the basis of the payment request received in step S1036 (S1037). In this way, in the present embodiment, the payment processing is performed between the wireless communication terminal 10 and the third server 60 in the E2E scheme, thereby also reducing the burden on the electronic money provider.

Upon completion of the payment processing in step S1037, the wireless communication terminal 10 transmits a payment completion notification to the second server 50 (S1038). In addition, the second server 50, when receiving the payment completion notification in step S1038, transmits a payment completion notification response to the wireless communication terminal 10 (S1039).

Then, the wireless communication terminal 10 transmits the payment completion notification to the R/W 20 on the basis of the reception of the payment completion notification response in step S1039 (S1040).

Then, the R/W 20 transmits the payment completion notification received in step S1040 to the POS 30 (S1041) and terminates the payment processing (S1030).

(Billing Processing)

The flow of the billing processing (S1050) according to the present embodiment is described with continued reference to FIG. 6. Referring to FIG. 6, the second server 50 according to the present embodiment outputs a processing log relating to payment, or the first server 40 captures the processing log (S1051).

In this event, the second server 50 is capable of outputting the processing log mentioned above on the basis of the store information, the payment information, and the selected type of electronic money, which are saved in step S1035. In addition, the second server 50 can output the processing log for each store or service provider. In addition, the output of the processing log by the second server 50 can be performed regularly or irregularly.

Then, the first server 40 executes the billing processing for the third server 60 on the basis of the processing log captured in step S1051 (S1052). Here, the billing processing in step S1052 can be performed by outputting a billing file and capturing the billing file, which is similar to step S1051. In addition, in this event, the first server 40 can output the billing file mentioned above for each third server 60 to be charged. The billing processing by the first server 40 can be performed regularly or irregularly.

The billing processing according to the present embodiment is described above. As described above, the billing processing according to the present embodiment can be implemented by outputting a file, capturing the file, or the like. In other words, the billing processing according to the present embodiment is not necessarily performed in online state in real time. Thus, the payment system according to the present embodiment makes it possible to reduce significantly the burden on the billing processing.

2. HARDWARE CONFIGURATION EXAMPLE

Figure 8:
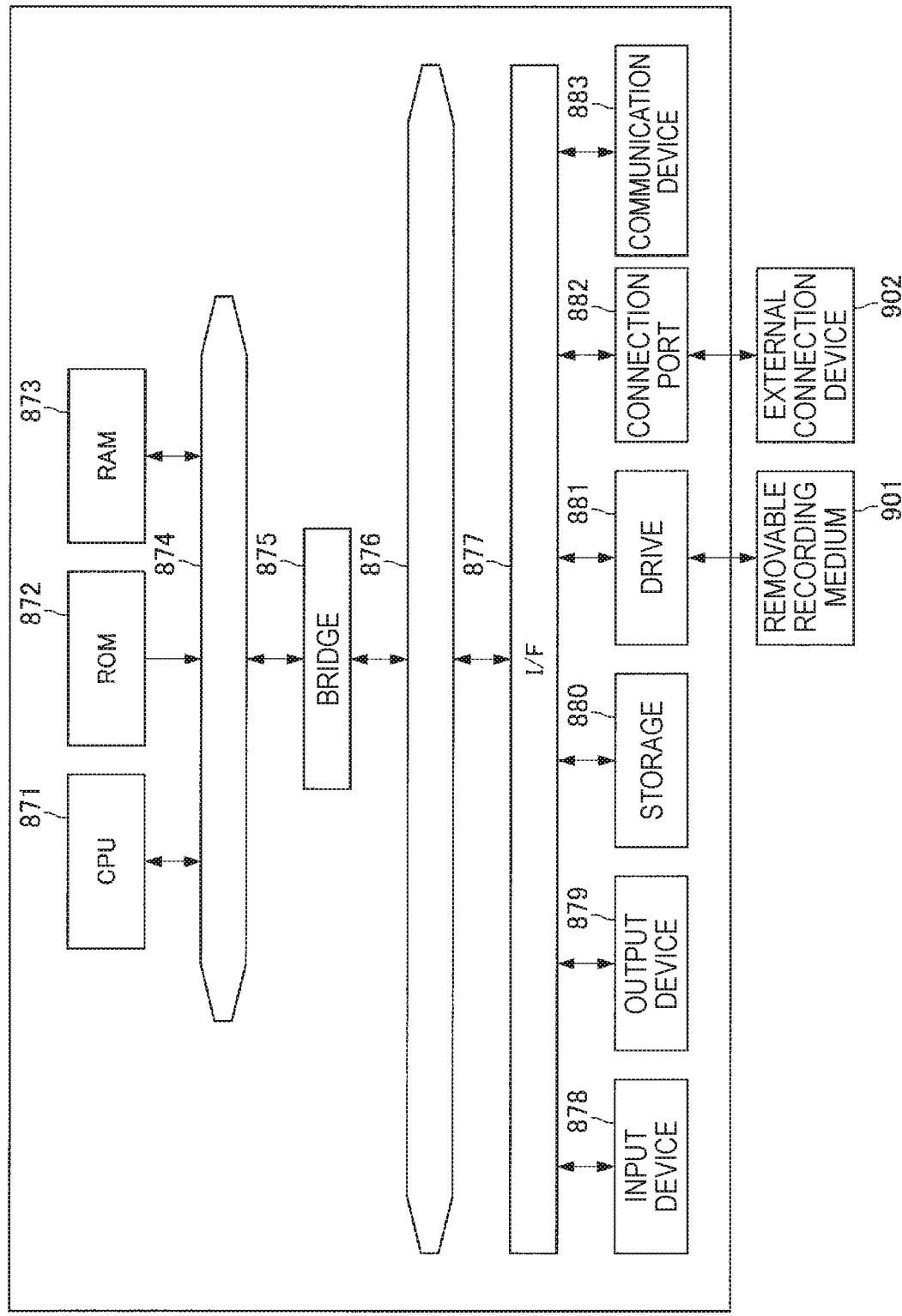
FIG. 8 is a hardware configuration example according to the present disclosure.

An example of the hardware configuration common to the wireless communication terminal 10 and the R/W 20 according to the present embodiment is described. FIG. 8 is a block diagram illustrating a hardware configuration example of the wireless communication terminal 10 and the R/W 20 according to the present embodiment. Referring to FIG. 8, the wireless communication terminal 10 and the R/W 20 each include, in one example, a CPU 871, a ROM 872, a RAM 873, a host bus 874, a bridge 875, an external bus 876, an interface 877, an input device 878, an output device 879, a storage 880, a drive 881, a connection port 882, and a communication device 883. Moreover, the hardware configuration shown here is illustrative, and some of components can be omitted. In addition, a component other than the components shown here can be further included.

(CPU 871)

The CPU 871 functions as, in one example, an arithmetic processing unit or a control device, and controls some or all of the operations of each component on the basis of various programs recorded in the ROM 872, the RAM 873, the storage 880, or a removable recording medium 901.

(ROM 872 and RAM 873)

The ROM 872 is a means for storing programs loaded into the CPU 871, data used for operation, or the like. The RAM 873 temporarily or permanently stores, in one example, a program to be loaded into the CPU 871, various parameters appropriately changing in executing the program, or the like.

(Host Bus 874, Bridge 875, External Bus 876, and Interface 877)

The CPU 871, the ROM 872, and the RAM 873 are mutually connected via, in one example, the host bus 874 capable of high-speed data transmission. On the other hand, the host bus 874 is connected to the external bus 876 having a relatively low data transmission rate, in one example, via the bridge 875. In addition, the external bus 876 is connected to various components via the interface 877.

(Input Device 878)

Examples of the input device 878 include a mouse, a keyboard, a touch panel, buttons, a switch, a lever, or the like. Furthermore, examples of the input device 878 include a remote controller capable of transmitting a control signal using infrared rays or other radio waves. In addition, the input device 878 includes a speech input device such as a microphone.

(Output Device 879)

The output device 879 is a device capable of visually or audibly notifying the user of the acquired information, which includes a display device such as a cathode ray tube (CRT), an LCD, or an organic EL, an audio output device such as a loudspeaker or a headphone, a printer, a mobile phone, a facsimile, or the like. In addition, the output device 879 according to the present disclosure can include various devices that provide a tactile sensation to a user, such as a motor that generates vibration.

(Storage 880)

The storage 880 is a device used to store various types of data. Examples of the storage 880 include a magnetic storage device such as hard disk drives (HDDs), a semiconductor storage device, an optical storage device, a magneto-optical storage device, or the like.

(Drive 881)

The drive 881 is a device that reads information recorded on the removable recording medium 901, such as magnetic disks, optical disks, magneto-optical disks, and semiconductor memory, or writes information to the removable recording medium 901.

(Removable Recording Medium 901)

Examples of the removable recording medium 901 include a DVD medium, a Blu-ray (registered trademark) medium, an HD DVD medium, various kinds of semiconductor storage media, or the like. Of course, the removable recording medium 901 can be, in one example, an IC card or an electronic device mounted with a contactless IC chip.

(Connection Port 882)

The connection port 882 is a port used for connection with an external connection device 902, such as a universal serial bus (USB) port, an IEEE 1394 port, a small computer system interface (SCSI), an RS-232C port, or an optical audio terminal.

(External Connection Device 902)

Examples of the external connection device 902 include a printer, a portable music player, a digital camera, a digital video camera, an IC recorder, or the like.

(Communication Device 883)

The communication device 883 is a communication device used for connection with a network, and examples thereof include a communication card for wired or wireless LAN, Bluetooth (registered trademark), BLE, NFC, or wireless USB (WUSB), a router for optical communication, a router for asymmetric digital subscriber line (ADSL), or a modem for various communications.

3. CONCLUDING REMARKS

As described above, the wireless communication terminal 10 according to the present disclosure encrypts the wireless communication channel with the R/W 20, and acquires the payment information, the store information, and the valid type of electronic money from the R/W 20 via the encrypted wireless communication channel. In addition, the wireless communication terminal 10 according to the present disclosure is capable of determining the third server to be connected on the basis of the received valid type of electronic money and the type of electronic money selected by the user and transmitting the payment request to the third server. Such a configuration makes it possible to further reduce the processing burden on the store side in the multi-payment.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In one example, although the embodiment mentioned above describes the case where the R/W 20 is Peripheral and the wireless communication terminal 10 is Central as an example, the present technology is not limited to this example. The roles of Peripheral and Central according to the present disclosure can be opposite to the above. In other words, in the present disclosure, the wireless communication terminal 10 can be Peripheral and the R/W 20 can be Central.

Further, although the embodiment mentioned above describes the case where the wireless communication terminal 10 includes the SE as an example, the payment processing according to the present disclosure can be implemented by a technique using host card emulation (HCE) or the like in addition to the technique using the SE.

Further, although the embodiment mentioned above describes the case where the wireless communication terminal 10 and the R/W 20 encrypt the wireless communication channel using the elliptic curve Diffie-Hellman key exchange (ECDHE) as an example, the present technology is not limited to this example. The wireless communication terminal 10 and the R/W 20 according to the present disclosure can encrypt the wireless communication channel using other widely used encryption techniques.

Further, the respective steps in the processing of the wireless communication terminal 10, the R/W 20, and the payment system according to the present disclosure are not necessarily processed in chronological order in accordance with the sequences listed in the sequence diagrams. The respective steps in the processing of the wireless communication terminal 10, the R/W 20, and the payment system can be processed in an order different from the sequences listed in the sequence diagrams or can be processed in parallel.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A wireless communication device including:

a communication unit configured to perform wireless communication with a connection device; and a control unit configured to encrypt a wireless communication channel with the connection device on the basis of a digital certificate issued by a certificate authority server.

in which the communication unit receives payment information and a valid type of payment from the connection device via the encrypted wireless communication channel, and the control unit determines a payment server on the basis of the valid type of payment and causes the communication unit to transmit a payment request based on the payment information to the payment server.

(2)

The wireless communication device according to (1),
in which the control unit determines the payment server further on the basis of a type of payment selected by a user.

(3)

The wireless communication device according to (2),
in which the control unit causes the communication unit to transmit the payment information and the selected type of payment to the certificate authority server and causes the communication unit to transmit the payment request to the payment server on the basis of payment approval received from the certificate authority server.

(4)

The wireless communication device according to (3),
in which the communication unit further receives store information from the connection device and further transmits the store information to the certificate authority server on the basis of control of the control unit.

(5)

The wireless communication device according to any of (2) to (4), further including:
an input/output unit configured to allow a user to select a type of payment.

(6)

The wireless communication device according to any of (1) to (5),
in which the control unit causes the communication unit to transmit a payment completion notification to the connection device on the basis of completion of payment processing based on the payment request.

(7)

The wireless communication device according to any of (1) to (6),
in which the communication unit receives a server certificate from the connection device, and
the control unit encrypts the wireless communication channel with the connection device on the basis of the server certificate and a CA certificate issued from the certificate authority server.

(8)

The wireless communication device according to any of (1) to (7),
in which the control unit causes the communication unit to transmit the payment request on the basis of retention of electronic money corresponding to the valid type of payment.

(9)

The wireless communication device according to (8),
in which the payment information includes at least a payment amount, and the control unit causes the communication unit to transmit the payment request on the basis of the electronic money having a balance equal to or more than the payment amount.

(10)

The wireless communication device according to any of (1) to (9),
in which the communication unit establishes wireless communication with the connection device on the basis of an advertisement transmitted from the connection device.

(11)

A wireless communication device including:
a communication unit configured to perform wireless communication with a connection device; and
a control unit configured to perform encryption processing relating to a wireless communication channel with the connection device on the basis of key information of the connection device, the key information being generated on the basis of a digital certificate issued by a certificate authority,
in which the control unit causes the communication unit to transmit payment information and a valid type of payment via the encrypted wireless communication channel.

(12)

A payment system including:
a first wireless communication device configured to transmit an advertisement relating to payment processing;
a second wireless communication device configured to establish wireless communication with the first wireless communication device on the basis of the advertisement; and
at least one or more payment servers configured to execute payment processing with the second wireless communication device on the basis of a payment request from the second wireless communication device,
in which the second wireless communication device includes
a communication unit configured to perform wireless communication with the first wireless communication device, and
a control unit configured to encrypt a wireless communication channel with the first wireless communication device on the basis of a digital certificate issued by a certificate authority,
the communication unit receives payment information and a valid type of payment from the first wireless communication device via the encrypted wireless communication channel, and
the control unit determines the payment server on the basis of the valid type of payment, causes the communication unit to transmit a payment request based on the payment information to the payment server.

REFERENCE SIGNS LIST

10 wireless communication terminal
110 communication unit
120 control unit
130 input/output unit
20 RAY
210 communication unit
220 control unit
230 input/output unit
30 POS
40 first server
50 second server
60 third server
70 network

The invention claimed is:

1. A method performed by a wireless communication terminal via a first server and a second server, the method comprising:
receiving, by the wireless communication terminal, a certificate from the second server;
establishing, by the wireless communication terminal, a wireless communication channel with a reader/writer computer;
receiving, by the wireless communication terminal, a certificate and a server public key from the reader/writer computer;
verifying, by the wireless communication terminal, the certificate from the reader/writer computer using the certificate from the second server;

generating, by the wireless communication terminal, a session key from the server public key, and creating, by the wireless communication terminal, an encrypted channel using the session key;

receiving, by the wireless communication terminal, payment information and payment type from the reader/writer computer via the encrypted channel;

determining, by the wireless communication terminal, the second server based on the payment type;

transmitting, by the wireless communication terminal, a request to the second server based on the payment information;

receiving, by the wireless communication terminal, a payment completion notification from the second server; and transmitting, by the wireless communication terminal, the payment completion notification, to a point of sale via the reader/writer computer.

2. The method according to claim 1, wherein the payment type is associated with a user.

3. The method according to claim 2, wherein the method further comprises:

transmitting, by the wireless communication terminal, the payment information and the payment type to a certificate authority server;

receiving, by the wireless communication terminal, a payment approval from the certificate authority server based on the transmitted payment information and the payment type; and transmitting, by the wireless communication terminal, a payment request to a payment server based on the received payment approval.

4. The method according to claim 3, wherein the method further comprises:

receiving, by the wireless communication terminal, a store information from the reader/writer computer; and transmitting, by the wireless communication terminal, the store information to the certificate authority server.

5. The method according to claim 2, wherein the method further comprises:

receiving, by the wireless communication terminal, a user input associated with the payment type.

6. The method according to claim 1, wherein the method further comprises:

storing, by the wireless communication terminal, an amount of electronic money corresponding to the payment type, and transmitting, by the wireless communication terminal, a payment request based on the stored electronic money corresponding to the payment type.

7. The method according to claim 6, wherein the payment information includes a payment amount.

8. The method according to claim 1, wherein the method further comprises:

prior to the establishing the wireless communication channel with the reader/writer computer, receiving, by the wireless communication terminal, an advertisement from a connection device, wherein the establishing of the wireless communication channel with the reader/writer computer is based on the received advertisement.

* * * * *